US010016826B2

(12) United States Patent
Brogni et al.

(10) Patent No.: US 10,016,826 B2
(45) Date of Patent: Jul. 10, 2018

(54) METHOD FOR CUTTING OR MACHINING GEAR TEETH AND GEAR-CUTTING MACHINE

(71) Applicant: GLEASON-PFAUTER MASCHINENFABRIK GMBH, Ludwigsburg (DE)

(72) Inventors: Johannes Brogni, Dotzigen (CH); Domenico Petrallia, Bern (CH); Oswald Witschi, Meinisberg (CH)

(73) Assignee: GLEASON-PFAUTER MASCHINENFABRIK GMBH, Ludwigshafen (DE)

( * ) Notice: Subject to any disclaimer, the term of this patent is extended or adjusted under 35 U.S.C. 154(b) by 328 days.

(21) Appl. No.: 14/768,013

(22) PCT Filed: Jan. 30, 2014

(86) PCT No.: PCT/EP2014/000250
§ 371 (c)(1),
(2) Date: Aug. 14, 2015

(87) PCT Pub. No.: WO2014/131488
PCT Pub. Date: Sep. 4, 2014

(65) Prior Publication Data
US 2015/0375320 A1 Dec. 31, 2015

(30) Foreign Application Priority Data

Feb. 26, 2013 (DE) .................. 10 2013 003 290

(51) Int. Cl.
*B23F 17/00* (2006.01)
*B23F 5/16* (2006.01)
*B23F 19/10* (2006.01)

(52) U.S. Cl.
CPC ............ *B23F 17/006* (2013.01); *B23F 5/163* (2013.01); *B23F 19/10* (2013.01)

(58) Field of Classification Search
CPC ......... B23F 17/006; B23F 19/10; B23F 5/163
See application file for complete search history.

(56) References Cited

U.S. PATENT DOCUMENTS

| 2,278,300 A | 3/1942 | Barter et al. |
| 2,916,971 A | 12/1959 | McNabb et al. |
| 2007/0020058 A1 | 1/2007 | Peiffer et al. |

FOREIGN PATENT DOCUMENTS

| DE | 1284256 B | 11/1968 |
| DE | 10211129 A1 | 10/2003 |

(Continued)

OTHER PUBLICATIONS

International Search Report and Written Opinion for PCT/EP2014/000250, ISA/EPO, dated Jul. 17, 2014, 12 pgs., with English translation (11 pgs.).

*Primary Examiner* — Moshe Wilensky
(74) *Attorney, Agent, or Firm* — Robert L. McDowell

(57) ABSTRACT

The invention concerns a method for the chip-removing generation or machining of gear teeth on a workpiece which is driven in rotary movement about its rotary axis at very high rates of rotation, with a toothed tool that is driven in rotary movement about its rotary axis, wherein the tool and the workpiece are brought into a rolling tooth engagement in the manner of a helical gear transmission with their axes of rotation crossing each other at an angle different from zero, and wherein a further operation is performed on the workpiece and/or on its gear teeth during the time of operating engagement between the teeth of the tool and of the workpiece.

7 Claims, 3 Drawing Sheets

(56) References Cited

FOREIGN PATENT DOCUMENTS

Figure 1:
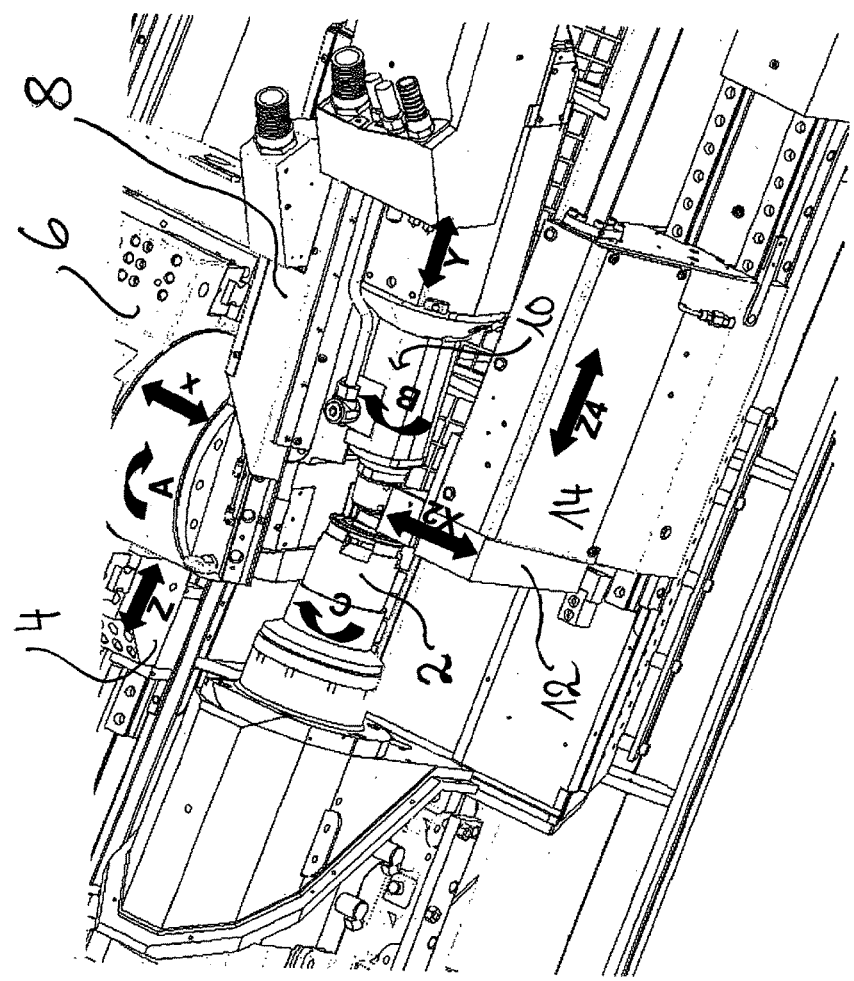

| | | |
|---|---|---|
| JP | 2005-022026 A | 1/2005 |
| WO | 2011-087759 A1 | 7/2011 |

METHOD FOR CUTTING OR MACHINING GEAR TEETH AND GEAR-CUTTING MACHINE

The invention concerns a method for the chip-removing generation or machining of gear teeth on a workpiece which is driven in rotary movement about its rotary axis at very high rates of rotation, with a toothed tool that is driven in rotary movement about its rotary axis, wherein the tool and the workpiece are brought into a rolling tooth engagement in the manner of a helical gear transmission with their axes of rotation crossing each other at an angle different from zero. The scope of the invention further extends to a control program for executing the method, and to a gear-cutting machine that is capable of carrying out the method.

Chip-removing machining methods with this kinematic configuration of the participating machine axes have been known for over a hundred years (DE 243 514). This category of machining methods includes for example the process of skiving an externally or internally toothed cylindrical wheel with a skiving wheel. A more extensive description of the kinematics of the skiving method and its differentiation, for example against the hobbing method may also be found in DE 10 2011 009 027 A1, whose disclosure content in regard to the kinematics of the machine axes (paragraphs [0003] to [0008]) is included herein by reference. Furthermore, the skiving process which within the applicant's organization is also referred to as "power skiving" counts as one of the preferred areas of application for the method of the invention.

Although the kinematic configuration of the machine axes already allows comparatively short process times to be realized in the machining of gear teeth on a workpiece, the invention has the objective to improve a method of the aforementioned kind specifically in regard to the total processing time for the machining of the workpiece.

From a method-oriented point of view, this task is solved by the invention through a further development of the method of the kind described above, which is characterized in essence by the distinguishing feature that a further operation is performed on the workpiece and/or on its gear teeth during the time of operating engagement between the teeth of the tool and of the workpiece. Thus, the machining of the teeth and the further operation overlap each other in time.

The invention is based on the surprising observation that, in addition to the operation being performed with the toothed tool it is possible to perform a further, parallel operation on the workpiece in spite of the very high rates of rotation of the workpiece of 1200 rpm or higher, preferably 1600 rpm or higher, even 2000 rpm or higher, and in particular 2400 rpm or higher. The further operation would otherwise have to be performed at another location and/or at another time, which would increase the total amount of time needed to produce the workpiece.

In a particularly preferred realization of the inventive concept, the further operation is a turning process. This allows the forming of further workpiece contours, for example a recess, in addition to the gear teeth of the workpiece. In this case, one even makes special use of the high rpm-rates of the workpiece.

Alternatively, or in addition, it is also conceivable to remove burrs that are already present or are being formed at the tooth edges of the gear teeth of the workpiece.

Preferably, the tool for the further operation is movable with a radial displacement component relative to the workpiece axis. Thus, for example the depth of a recess can be varied through a relative movement of the tool used for the further operation.

In a further preferred configuration, the tool for the further operation is also movable with an axial displacement component relative to the workpiece axis. This allows more freedom in the axial positioning of, e.g., a recess.

In principle, the method is applicable for external as well as for internal gear teeth and for external as well as internal machining operations.

In a particularly preferred further development of the invention, the further operation concerns the machining of an internally toothed workpiece, in particular also in the form of an internal machining process.

According to a special embodiment of the invention, the tool for the further operation and/or its holder are preferably arranged to extend next to the toothed tool at least through part of the space that is radially enclosed by the internal gear teeth. This opens the additional possibilities to form recesses on the inside surface of the workpiece and also to remove burrs at the tooth edges of the internal gear teeth on the side that faces away from the side being machined by the toothed tool.

In principle, the method is applicable over a comparatively wide range of crossing angles of the axes. Good cutting characteristics are achieved for example with crossing angles of more than 15° to 45°, and large feed movements are possible in the machining of the gear teeth. In a particularly preferred realization of the method, the machining of the gear teeth is performed under an axis-crossing angle of 15° or less. This allows sufficiently high rpm-rates to be achieved with satisfactory cutting velocities, although only small feed movements are possible and the chip-cutting path is short. In regard to the tooth geometry, this is rather approaching the area of gear shaping. But on the other hand, it is preferred to work with a crossing angle of at least 5° and preferably at least 8°. This prevents the problem that the material is pushed ahead of the tool and the chips are no longer cleanly cut.

The invention further places a control program under protection which, when executed on a controller device of a gear-cutting machine, controls the gear-cutting machine in performing a method according to one of the methods-oriented aspects described above.

Furthermore, from an apparatus-oriented point of view, a gear-cutting machine is placed under protection for the chip-removing generation or machining of gear teeth on a workpiece that is driven in rotary movement about its axis of rotation at a very high rpm-rate, using a toothed tool that is driven in rotary movement about its axis of rotation, with machine axes for the setting of the crossing angle of the axes and the distance between the axes of the workpiece and the tool and with at least one machine axis for a change of the relative position between workpiece and tool in the direction of the workpiece axis. The gear-cutting machine according to the invention is distinguished in essence by the presence of at least one additional movement axis along which a further machining tool can be brought into machining engagement with the workpiece with a movement component orthogonal to the workpiece axis.

The advantages of the gear-cutting machine according to the invention are a consequence of the advantages of the method according to the invention.

In particular, to allow the method to be performed, there is at least one additional displacement axis by way of which the tool for the further operation can be moved with a displacement component parallel to the workpiece axis.

The tool for the further operation itself can also be part of the gear-cutting machine. As a particularly advantageous feature that is envisioned in this context, the tool for the further operation and/or its holder are designed and arranged on the machine in such a way that they can at least in part occupy the space that is enclosed by the internal gear teeth of the workpiece that is to be machined while the toothed tool is simultaneously present in that space.

A controller device of the gear-cutting machine can be equipped with the control program according to the invention.

The preferred choice for the controller is a computerized numerical control system (CNC) for the control of all of the machine axes and allowable displacement axes. The individual drive sources for the machine axes are preferably direct drives, in particular the drive mechanisms for the rotations of the tool spindle axis and the workpiece spindle axis.

Figure 2:
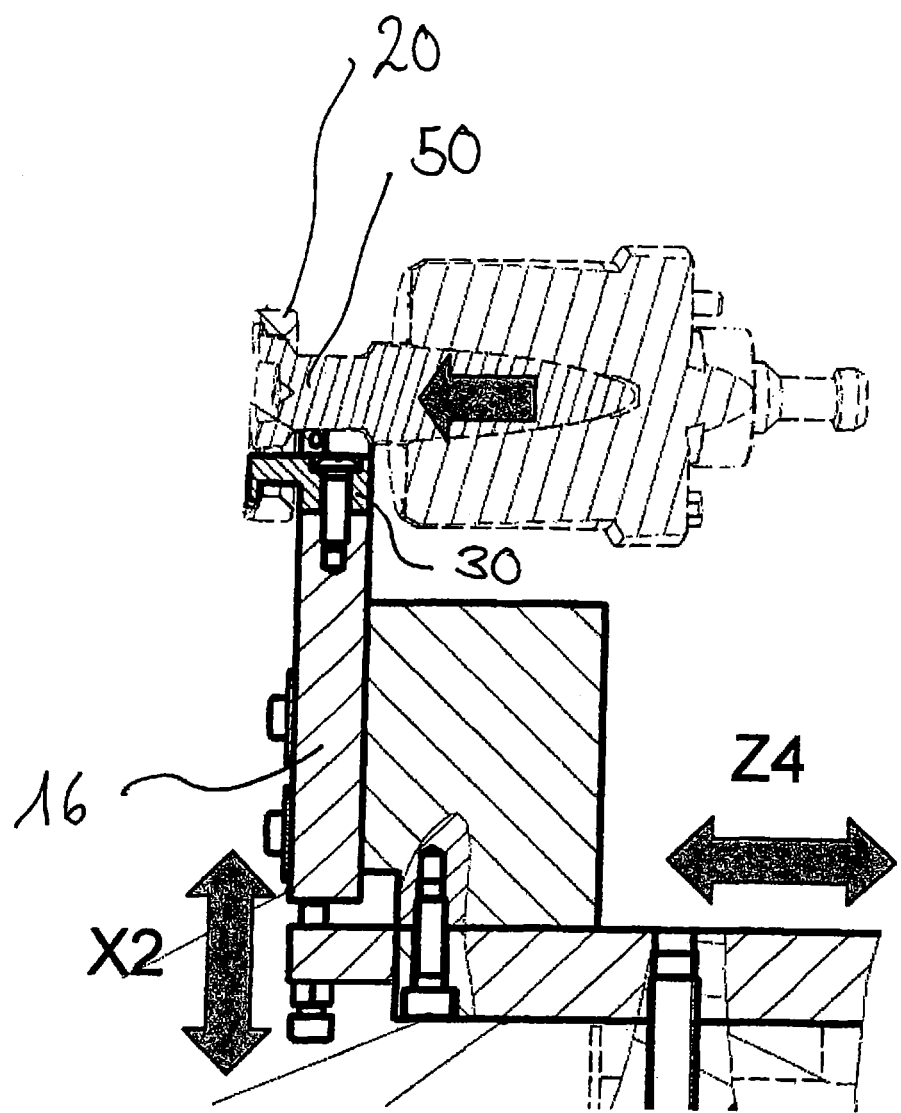
Figure 3:
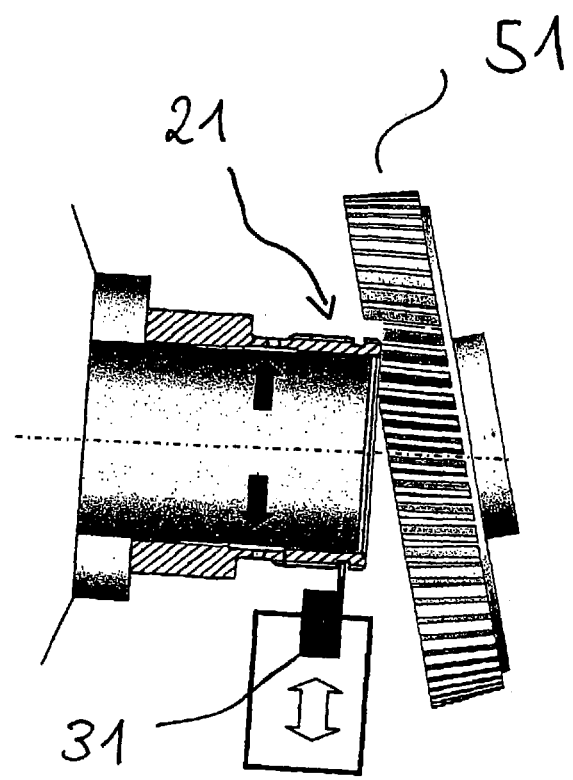

Further advantages, distinguishing features and details of the invention will become evident from the following description which refers to the attached drawings, wherein FIG. 1 represents a part of a gear-cutting machine that includes the available movement axes in a perspective view from above;

FIG. 2 illustrates how a tool for a further operation is coupled to the gear-cutting machine; and FIG. 3 illustrates another arrangement of a tool for a further operation.

In a perspective view from above, FIG. 1 shows a portion of a gear-cutting machine in which the movement axes of the machine can be seen. The gear-cutting machine is designed for the machining of a workpiece in which gear teeth are generated on the workpiece through an operating engagement between the tool and the workpiece with the respective axes of the workpiece and the tool crossing each other at an angle. In the actual example illustrated here, the machine is being employed for the skiving of internal gear teeth and is referred to as a skiving machine.

The skiving machine 100 has a workpiece spindle 2 that is rotatably supported in a fixed position on the machine bed of the skiving machine, with the rotary axis for the rotation of the workpiece being identified as C. Associated with the tool is a horizontal carriage 4 which is movable relative to the machine bed along a linear displacement axis Z that runs parallel to the axis of the workpiece spindle.

The horizontal carriage 4 carries a further horizontal carriage 6 which is movable along a second linear displacement axis X that runs orthogonal to the linear displacement axis Z of the carriage 4. The carriages 4 and 6 thus form a cross-slide arrangement.

A further linear carriage 8 which holds the tool spindle 10 is arranged with the ability to swivel about a rotary axis A that runs parallel to the second linear displacement axis X. The linear displacement axis Y of the swivelable carriage 8 is thus determined by the swivel position of the rotary movement about A. The tool rotates about the axis B which runs parallel to the linear displacement axis Y. Thus, with the capability to swivel about the axis A, the crossing angle of the axes is set for the generating and machining of the internal gear teeth of the workpiece.

In the illustrated example, direct drives are provided for the respective rotations C and B of the workpiece spindle of the tool spindle. In accordance with common practice, the movements along X, Y, Z and about A, B, C are performed under computerized numerical control (CNC), which is not shown in the drawing. The configuration of the machine tool 100 as described up to this point belongs to the known state of the art. In addition to the skiving of internal or external gear teeth, the machine is further suitable for hard-finishing operations in which the axes are crossed at an angle, and also for shaving operations (soft shaving).

However, the skiving machine 100 includes a further motion device relative to the plane that is defined by the respective axes C and B of the workpiece spindle and the tool spindle opposite the tool carriage arrangement 4, 6, 8. This further motion device is realized as a cross-slide arrangement 12, 14 with a carriage 14 movably constrained on the machine bed along the fourth linear displacement axis Z4 which runs parallel to the first linear displacement axis Z. The horizontal carriage 14, in turn, carries a further horizontal carriage 12, whose linear displacement axis X2 runs parallel to the second linear displacement axis X as a fifth linear displacement axis of the skiving machine 100. Although not strictly required, the parallelism of the axes Z4 and Z as well as of X2 and X is advantageous. In this embodiment, it is of importance that one of the carriages 12, 14 can perform a movement with a vector component parallel to the first linear displacement axis Z, while the other of the carriages 12, 14 can perform a movement with a vector component in the direction of the second linear displacement axis X. The drive mechanisms of the carriages 12 and 14 are likewise running under the CNC control of the skiving machine 100.

FIG. 2 illustrates in a horizontal cross-sectional detail view, how the space enclosed by the internal gear teeth 20 of a workpiece that is otherwise not shown in the drawing is simultaneously occupied by a deburring tool 30 that is mounted on an arm 16 projecting from the horizontal carriage 12 and attached to the latter and by a skiving wheel 50. While the skiving wheel 50 generates the internal gear teeth 20, the deburring tool 30 already deburrs the tooth edges at the left end of the teeth (relative to the width of the tooth shown in FIG. 2). The deburring tool 30 and the skiving wheel 50 are separated by a safe distance to prevent them from coming into contact with each other. It is evident that the deburring tool 30 as illustrated or in a modified form could also be used for the turning of an internal recess in the region of the internally toothed workpiece that lies behind the internal gear teeth 20 and is not otherwise shown in the drawing.

In regard to the time sequence in which the machining tools are moved into their operating positions, it is advantageous if the deburring tool is introduced first and if the skiving wheel 50 is moved into position and the generating or machining of the internal teeth is started only after the deburring tool is in place.

FIG. 3 represents a further embodiment wherein external gear teeth 21 are generated on a workpiece by means of a skiving wheel 51. The further axes of movement for the skiving are not shown in this drawing, but from the inclined position of the skiving wheel axis relative to the workpiece axis it is evident that the axes cross each other at an angle. Shown in the lower part of FIG. 3 is a hydraulically operated carriage with a further machining tool 31 which is movable in the radial direction of the externally toothed workpiece and which, in parallel with the action of the skiving wheel 51, performs the operation of generating a recess on the workpiece. The further machining tool 31 can also be used to perform deburring operations on the external gear teeth 21 directly after they have been cut.

The invention is not limited to the details presented in the description of the drawings. Rather, the features set forth in the following claims as well as in the foregoing description, used individually or in combination, can be essential for the realization of the invention in its different embodiments.

The invention claimed is:

1. Method for a chip-removing generation of internal gear teeth (20; 21) on a workpiece by power skiving, wherein the workpiece is driven in rotary movement about its rotary axis at a rate of rotation of 1200 RPM or higher, with a toothed tool (50; 51) that is driven in rotary movement about its rotary axis, wherein the tool and the workpiece are brought into a rolling tooth engagement in the manner of a helical gear transmission with their axes of rotation crossing each other at an angle different from zero, characterized in that a further internal machining operation is performed on the workpiece and/or on the internal gear teeth during the time of operating engagement between the teeth of the toothed tool and of the workpiece, wherein a tool (30; 31) for the further internal machining operation and/or a holder for said tool are arranged to extend next to the toothed tool at least through part of the space that is radially enclosed by the internal gear teeth (20).

2. Method according to claim 1, wherein the further operation comprises a turning operation.

3. Method according to claim 1 wherein the further operation comprises a deburring operation.

4. Method according to claim 1 wherein a machining tool (30; 31) for the further operation is movable with a movement component (X2) orthogonal to the workpiece axis.

5. Method according to claim 1 wherein a machining tool (30; 31) for the further operation is movable with a movement component (Z4) parallel to the workpiece axis.

6. Method according to claim 1 wherein the angle at which the axes cross each other is 15° or smaller.

7. Method according to claim 1, said method being carried out on a gear-cutting machine having a controller, said controller executing a control program which controls said gear-cutting machine to carry out said method.

* * * * *